United States Patent
Rainho

(10) Patent No.: US 6,666,466 B1
(45) Date of Patent: Dec. 23, 2003

(54) HAND CART CARGO NETTING ATTACHMENT

(76) Inventor: Mark Rainho, 16296 Cordovan St., Chino Hills, CA (US) 91709

( * ) Notice: Subject to any disclaimer, the term of this patent is extended or adjusted under 35 U.S.C. 154(b) by 0 days.

(21) Appl. No.: 10/122,953

(22) Filed: Apr. 12, 2002

(51) Int. Cl.[7] .................................................. B62B 1/00
(52) U.S. Cl. ..................................... 280/47.27; 410/97
(58) Field of Search .................... 280/47.131, 47.17, 280/47.18, 47.23, 47.24, 47.27, 47.28, 47.29, 79.2, 79.3, 79.4, 79.5, 79.6, 79.7, 652, 654, 47.26; D34/26; 298/2; 414/449; 410/97

(56) References Cited

U.S. PATENT DOCUMENTS

| | | | |
|---|---|---|---|
| 2,052,766 A | * 9/1936 | Haynes | |
| 2,415,334 A | * 2/1947 | Brown | 280/47.26 |
| 2,778,654 A | * 1/1957 | Gottlieb | 280/47.24 |
| 2,814,402 A | * 11/1957 | Schaefer | |
| 4,294,463 A | * 10/1981 | Kotani | 280/47.29 X |
| 4,726,602 A | * 2/1988 | Sanders et al. | 280/654 |
| 5,058,786 A | * 10/1991 | Politi | 410/97 X |
| 5,941,666 A | * 8/1999 | Waters | 410/97 X |
| 6,017,174 A | * 1/2000 | Ross et al. | 410/97 X |
| 6,109,846 A | * 8/2000 | Davis et al. | 410/97 X |
| 6,170,839 B1 | * 1/2001 | Kizewski | 280/47.26 |
| 6,447,002 B1 | * 9/2002 | Fang | 280/47.29 X |
| 6,543,800 B1 | * 4/2003 | Doran | 280/652 |

* cited by examiner

*Primary Examiner*—Brian L. Johnson
*Assistant Examiner*—Bryan Fischmann
(74) *Attorney, Agent, or Firm*—Goldstein & Lavas, P.C.

(57) ABSTRACT

A hand cart cargo netting attachment containing a quantity of netting, the attachment for use with a standard hand cart. The attachment has a housing holding the netting and a mounting plate attached to the hand cart. A mounting plate secures to the hand cart and the housing is mated to the rear surface of the mounting plate. The netting is pulled out from the housing interior, at one side of the housing, is wrapped around the hand cart and any packages held thereon, and is then secured to the opposite side of the housing. Once the netting is secured in place, the packages are themselves secured onto the cart.

9 Claims, 2 Drawing Sheets

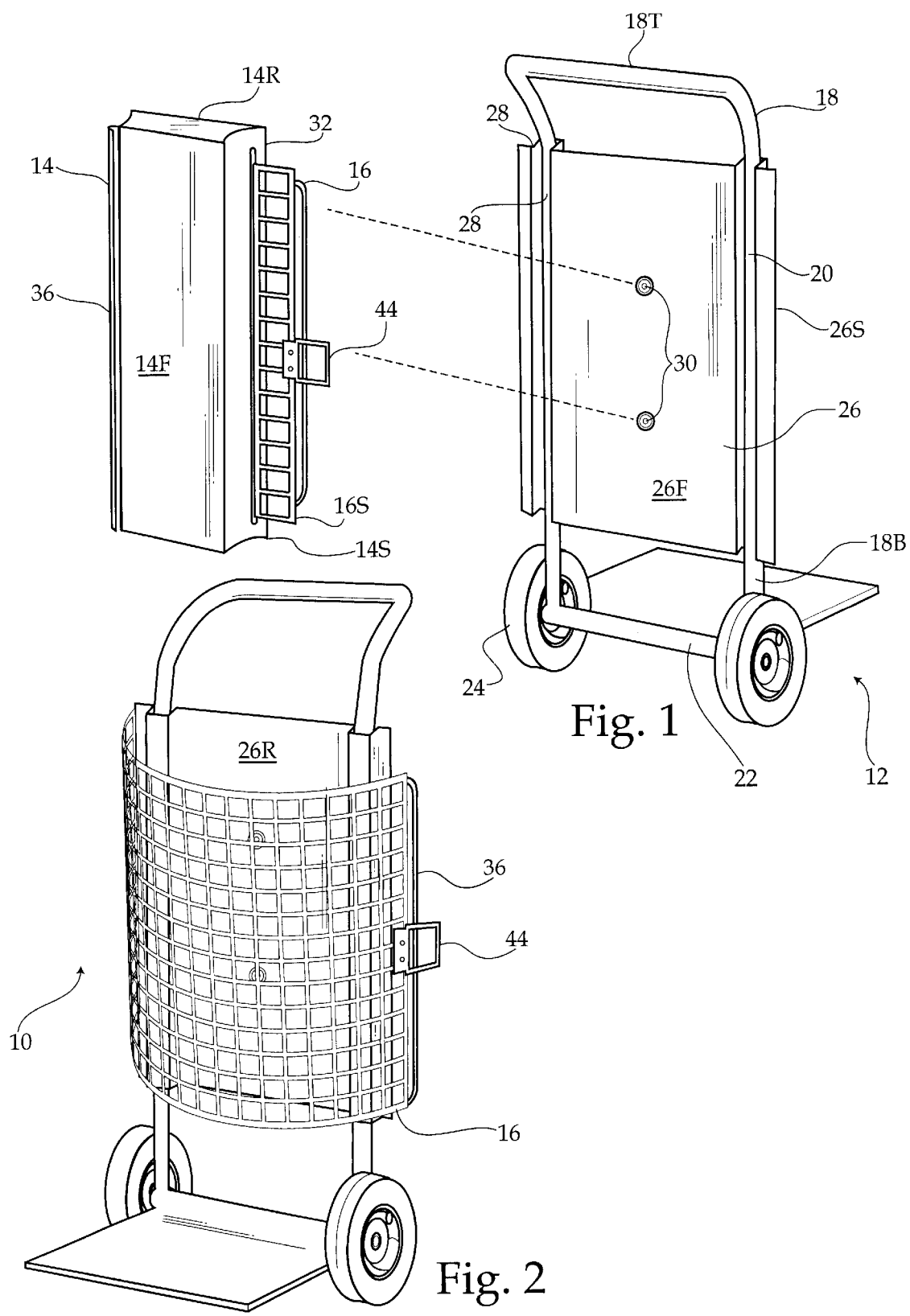

HAND CART CARGO NETTING ATTACHMENT

BACKGROUND OF THE INVENTION

The invention relates to a hand cart cargo netting attachment. In particular, the invention is a netting attachment that is mated with a standard hand cart. Once packages are loaded onto the hand cart, the netting is pulled from the attachment and wrapped around the cart in order to hold any packages securely to the hand cart.

A hand cart is an effective means of transporting packages and cargo, particularly heavy and cumbersome packages. However, because of the design of a typical hand cart, it is common for packages to fall off the cart when the packages are too light, too heavy, when the cart is moved too quickly, or when the cart is suddenly tipped up. Further, most hand carts have a substantially open back portion, thus leaving the possibility of smaller items from falling therethrough.

Thus, there exists a need for a hand cart attachment that contains a durable netting for extending around the hand cart and any cargo held thereon. When properly used, the netting serves to hold the cargo on the cart in place, regardless of the size, shape or weight of said cargo. Such an attachment should be lightweight and compact so as not to interfere with the maneuvering of the hand cart.

While the units available may be suitable for the particular purpose employed, or for general use, they would not be as suitable for the purposes of the present invention as disclosed hereafter.

SUMMARY OF THE INVENTION

In view of the foregoing disadvantages inherent in the prior art, the present invention provides an improved hand cart cargo netting attachment. As such, the general purpose of the present invention, which will be described subsequently in greater detail, is to provide a new and improved hand cart cargo netting attachment which has all the advantages of the prior art and none of the disadvantages.

To attain this, the present-invention essentially comprises a hand cart cargo netting attachment containing a quantity of netting, the attachment for use with a standard hand cart. The attachment has a housing holding the netting and a mounting plate attached to the hand cart. A mounting plate secures to the hand cart and the housing is mated to the rear surface of the mounting plate. The netting is pulled out from the housing interior, at one side of the housing, is wrapped around the hand cart and any packages held thereon, and is then secured to the opposite side of the housing. Once the netting is secured in place, the packages are themselves secured onto the cart.

It is an object of the invention to produce a hand cart cargo netting attachment that contains a quantity of netting for wrapping around the hand cart and any cargo contained thereon, wherein the netting holds the cargo in place. Accordingly, the attachment is secured to a mounting plate on the back of the hand cart, said attachment containing netting on a reel. A length of netting is pulled out from the attachment and extended around the cart.

It is a further object of the invention to produce a hand cart cargo netting attachment that is lightweight and compact so as not to interfere with the maneuvering of the hand cart.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a rear perspective view of the hand cart cargo netting attachment being attached to a hand cart.

FIG. 2 is a front perspective view of the hand cart cargo netting attachment secured to a hand cart.

Figure 3:
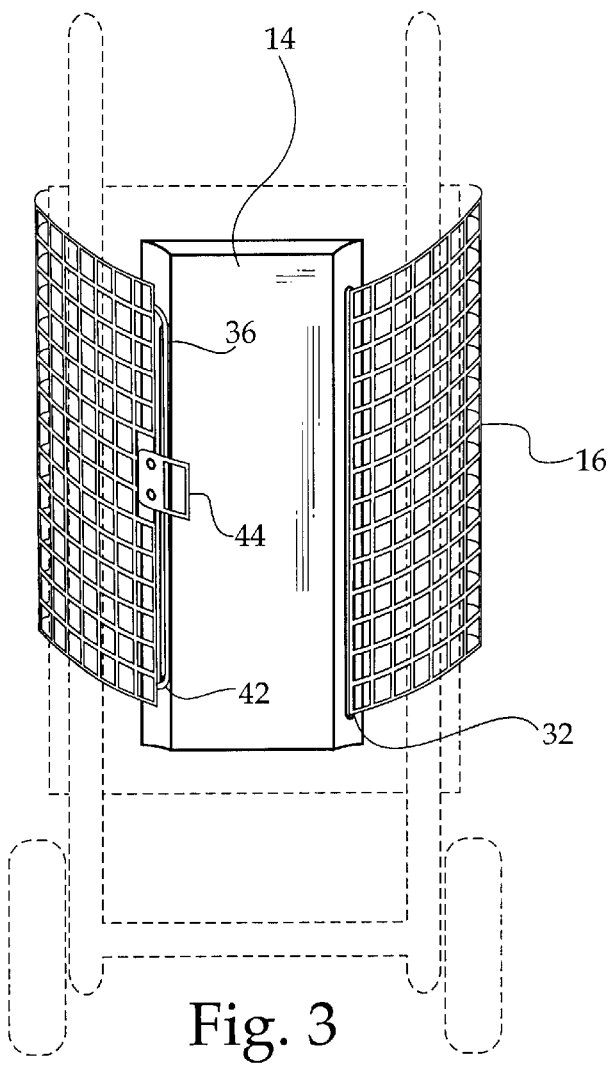
FIG. 3 is a rear perspective view of the hand cart cargo netting attachment extended around a hand cart, the hand cart shown in broken lines.
Figure 4:
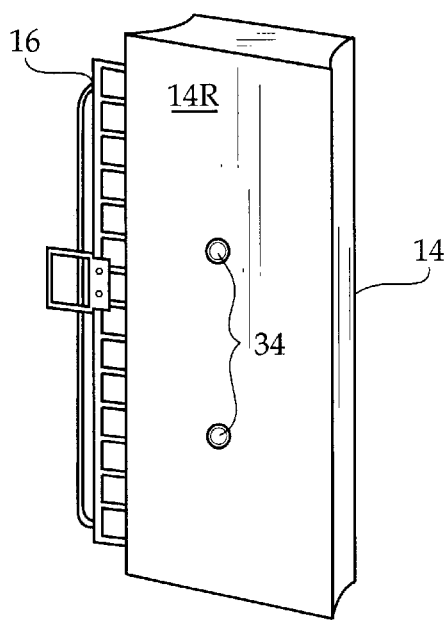
FIG. 4 is a rear perspective view of the hand cart cargo netting attachment.

REFERENCE NUMERALS 10 hand cart cargo netting attachment
12 hand cart
14 housing
14F front surface of housing
14R rear surface of housing
14S side wall of housing
16 netting
16S side edge of netting
18 frame
18T top portion of frame
18B bottom portion of frame
20 rail of hand cart frame
20 axle
24 wheel
26 mounting plate
26F front surface of mounting plate
26R rear surface of mounting plate
26S side edge of mounting plate
28 U-shaped channel of mounting plate
30 mounting bracket
32 slot
34 aperture on rear surface of housing
36 cuff
38 spool
40 spring
42 cuff grip
44 handle

DETAILED DESCRIPTION OF THE PREFERRED EMBODIMENTS

FIG. 1 illustrates a hand cart cargo netting attachment 10, essentially comprising a length of netting 16, a housing 14 containing the netting 16, and a mounting plate 26 secured to a standard hand cart 12.

The hand cart 12 has a frame 18 with a top portion 18T, a bottom portion 18B, and two parallel vertical rails 20 between the top portion 18T and the bottom portion 18B. The top portion 18T connects the vertical rails 20 and is curved towards the rear of the cart 12, serving as a handle when pushing same. The bottom portion 18B has an axle 22 that attaches a pair of wheels 24 to the cart 12. A mounting plate 26 extends outward from the axle 24, forming a substantially right angle with the vertical rails 20, wherein packages are placed on the plate 26 for transport.

A mounting plate 26 extends between the pair of vertical rails 20 on the hand cart 12. The plate 26 has a front surface 26F, a rear surface 26R, and two side edges 26S. A U-shaped channel 28 extends vertically near both side edge 26S, said channels 28 sized to accommodate the vertical rails 20 of the cart 12. The housing 14 is secured to the mounting plate 26 on the hand cart 12, thereby allowing the netting 16 to be wrapped around said hand cart 12 to secure packages in place while on the cart 12. The mounting plate 26 has a plurality of mounting brackets 30 for securing the housing 14 thereto.

The netting 16 is contained within the housing 14 on a spool 38 which is spring loaded so that the spool 38 allows the netting 16 to be extended, maintains significant tension on the packages, and automatically retracts when released, similar to a window shade. The netting 16 has a side edge 16S with a cuff grip 42 attached thereto. The cuff grip 42 extends vertically down the netting side edge 16S, said grip 42 for securing the netting in place around the cart 10, as will be described in greater detail hereinafter. A handle 44 is also secured to the netting side edge 16S, allowing the user 16 is easily pull the netting 16 out from inside the housing 14 and around cargo.

The housing 14 has a front surface 14F, a rear surface 14R, and a pair of opposite side walls 14S. One side wall 14S has a slot 32 extending vertically down the length of said wall 14S. The netting 16 is dispensed from the interior of the housing 14 through the slot 32. The opposite side wall 14S has a cuff 36 that extends vertically down the length of the wall 14S. The cuff 36 is mateable with the cuff grip 42 on the netting 16. When the netting 16 is pulled from the housing 14 and stretched around the front of the hand cart 12, the netting 16 is wrapped around towards the opposite side wall 14S of the housing. The cuff grip 42 is then mated with the cuff 36 thereat in order to hold the netting 16 in place.

The rear surface 14R of the housing 14 has a plurality of apertures 34 for mating with the mounting brackets 30 on the mounting plate 26. The apertures 34 are sized and spaced to coincide with the brackets 30, thereby allowing the housing 14 to be securely fastened onto the mounting plate 26. This configuration also allows for easy removal of the housing 14 from the cart 12 when the netting 16 is not needed.

In use, the mounting plate 26 is attached to the vertical rails 20 of the hand cart frame 18 by inserting the rails 20 into the U-shaped channels 28 of the plate 26 and affixing the mounting plate 26 to the vertical rails 20 by any suitable method or device. The housing 14 is then attached to the mounting plate 26 by mating the apertures 34 on the housing rear surface 14R with the mounting brackets 30 on the mounting plate rear surface 26F. Once the housing 14 is in place, the user holds the netting handle 44 and pulls same away from the housing 14. The netting 16 is then wrapped around the hand cart 12 and any packages thereon. The cuff grip 36 of the netting 16 is interlocked with the cuff 36 on the housing 14, thereby securing the netting 16 around the cart 12 and packages. To remove the netting 16, the cuff grip 36 is unhooked from the cuff 36 and the netting 16 is retracted into the housing 14.

In conclusion, herein is presented a hand cart cargo netting attachment. The invention is illustrated by example in the drawing figures, and throughout the written description. It should be understood that numerous variations are possible, while adhering to the inventive concept. Such variations are contemplated as being a part of the present invention.

What is claimed is:

1. A hand cart cargo netting attachment for use with a hand cart, the hand cart having a frame with two vertical rails and a horizontal bottom platform for supporting packages, comprising:

a mounting plate extending between the pair of vertical rails on the hand cart, the mounting plate having a front surface, a rear surface, and two side edges, the mounting plate has a pair of U-shaped channels extending vertically near the side edges theredown, said channels sized to accommodate the vertical rails of the cart; and a housing mountable on the mounting plate rear surface, the housing having a front surface, a rear surface, and a pair of opposite side walls, one side wall having a slot extending vertically down the length of said wall, a quantity of netting contained within the housing and selectively extending out of said side wall, the opposite side wall having a cuff that extends vertically down the length of the wall, said cuff being mateable with the netting.

2. The hand cart cargo netting attachment as recited in claim 1, wherein the rear surface of the mounting plate has a plurality of mounting brackets.

3. The hand cart cargo netting attachment as recited in claim 2, wherein the housing rear surface has a plurality of apertures for mating with the mounting brackets on the mounting plate.

4. The hand cart cargo netting attachment as recited in claim 3, wherein the netting has a side edge and a cuff grip extending vertically down the side edge, said cuff grip being mateable with the cuff on the side edge of the housing.

5. The hand cart cargo netting attachment as recited in claim 4, wherein the netting side edge further comprises a handle, said handle used to pull the netting from the interior of the housing.

6. The hand cart cargo netting attachment as recited in claim 5, wherein the netting is contained on a spool within the housing.

7. A method of securing packages onto a hand cart using netting in a hand cart cargo netting attachment, the hand cart having a frame having two vertical rails, the attachment having a mounting plate having a front surface, a rear surface, two side edges, and a U-shaped vertical channel along each side edge, a housing having a front surface, a rear surface, and two side walls, one side wall having a slot, and the opposite side wall having a vertical cuff extending theredown, and netting having a side edge, a cuff grip along the side edge, and a handle, comprising the steps of:

attaching the mounting plate to the hand cart by inserting the vertical rails of the hand cart into the plate U-shaped channels;

securing the housing to the mounting plate;

extending the netting from the slotted side wall around the front of the hand cart; and securing the netting to the opposite side of the housing by interlocking the cuff grip on the netting with the cuff on the housing.

8. The method of securing packages onto a hand cart as recited in claim 7 wherein the step of extending the netting around the front of the hand cart further comprises the steps of:

gripping the handle on the netting;

pulling the netting outward from the interior of the housing; and wrapping the netting around the hand cart towards the front surface of the housing.

9. The method of securing packages onto a hand cart as recited in claim 8 wherein the housing further comprises a plurality of apertures on the rear surface, and the mounting plate further comprises a plurality of mounting brackets on the rear surface, and step of securing the housing to the mounting plate further comprises the steps of:

positioning the housing for securement to the mounting plate by placing the rear surface of the housing adjacent to the rear surface of the mounting plate; and aligning the apertures on the housing with the mounting brackets on the mounting plate.

\* \* \* \* \*